United States Patent [19]

Pellenc

[11] 4,109,381

[45] Aug. 29, 1978

[54] HYDRAULIC SECATEURS

[76] Inventor: Roger Joseph Pellenc, Route de Villelaure, Pertuis 84120, France

[21] Appl. No.: 750,526

[22] Filed: Dec. 14, 1976

[30] Foreign Application Priority Data

Dec. 24, 1975 [FR] France ................................. 75 40194
Oct. 15, 1976 [FR] France ................................. 76 31808

[51] Int. Cl.² .............................................. B26B 15/00
[52] U.S. Cl. ......................................... 30/228; 30/249
[58] Field of Search .......................... 30/249, 228, 180

[56] References Cited

U.S. PATENT DOCUMENTS

| 2,733,506 | 2/1956 | Wild | 30/249 |
| 3,476,015 | 11/1969 | Ackley | 30/228 |

Primary Examiner—Robert C. Watson
Attorney, Agent, or Firm—William Anthony Drucker

[57] ABSTRACT

A hydraulic secateurs has two blades at least one of which is a movable blade operated by a hydraulic device including a drive piston controlled by the movable blade and mounted for sliding with play in a longitudinal bore formed in a handle for the secateurs, and a hydraulic distributor controlling the movements of the piston and including a distributing slide valve moving in a cylindrical jacket positioned to the rear of the drive piston and perpendicularly to its axis. The improvement is that the jacket is provided with spaced peripheral grooves into which there open radial apertures in its side wall, one of the peripheral grooves being positioned in permanent communication with an aperture communicating with the bore in which the piston moves, and capable of being put into communication, according to the position of the distributing slide valve, either with the groove which is in constant communication with the intake of hydraulic fluid under pressure, or with the groove permanently communicating with the return aperture for said fluid.

9 Claims, 10 Drawing Figures

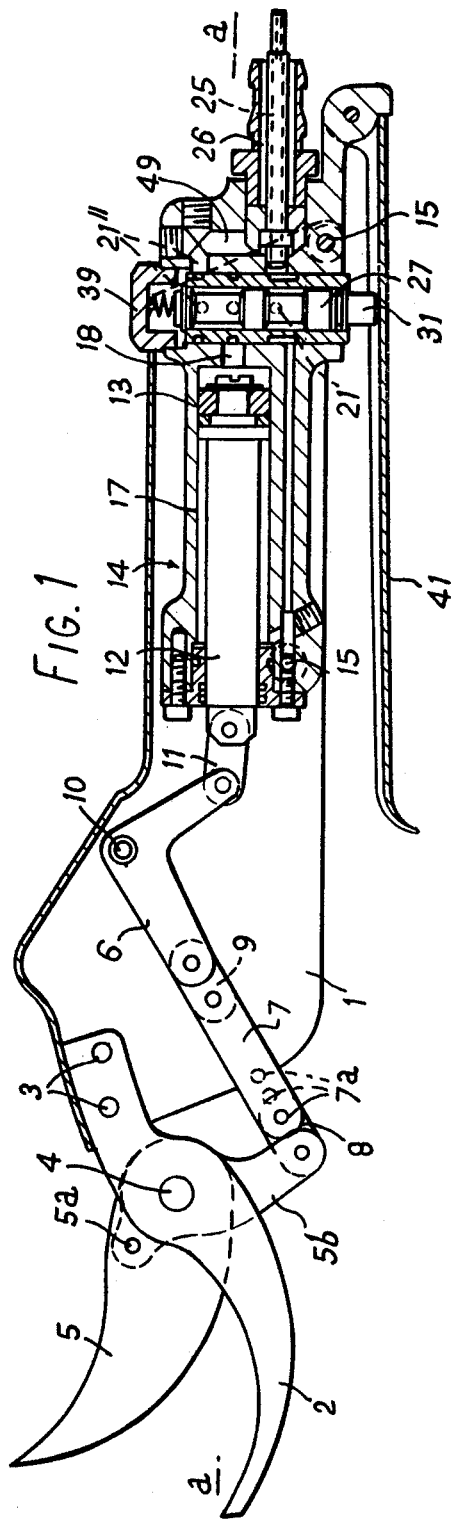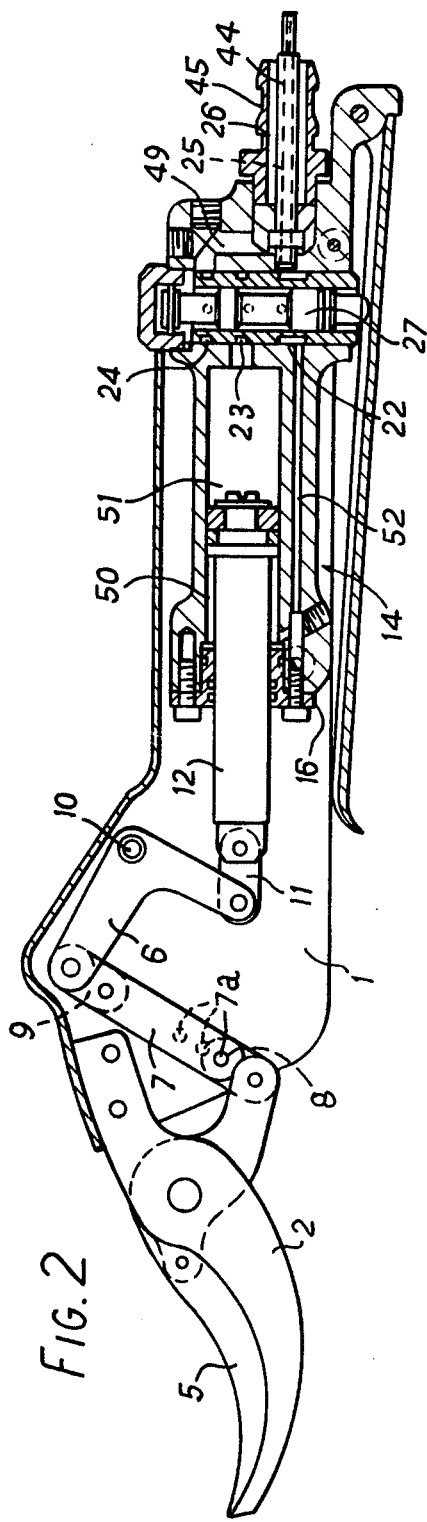

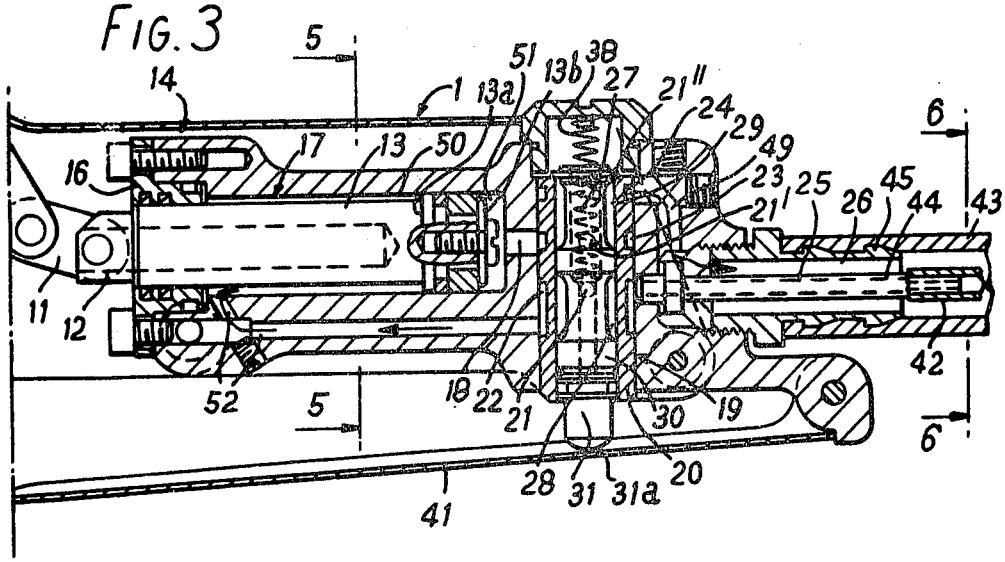
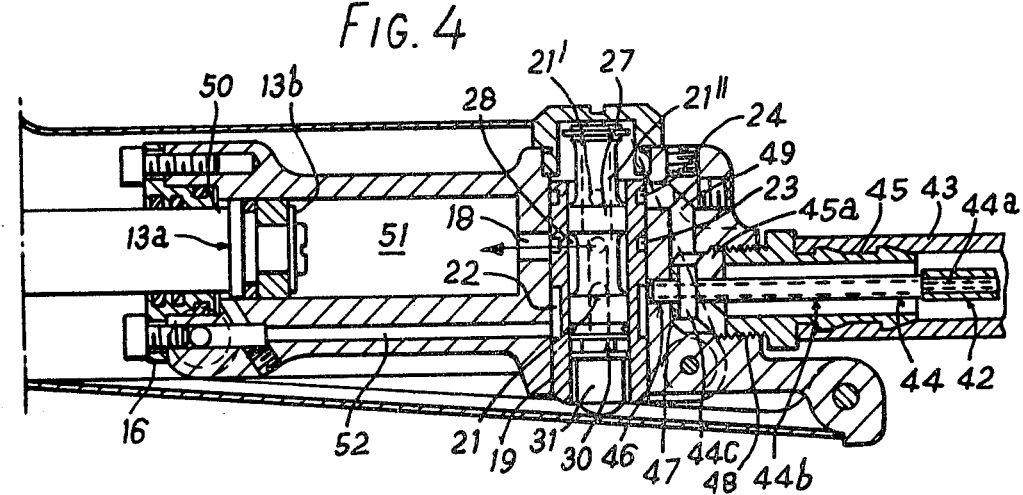
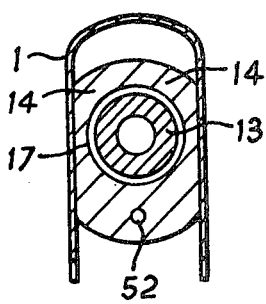
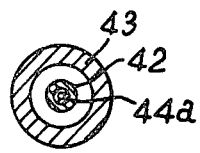

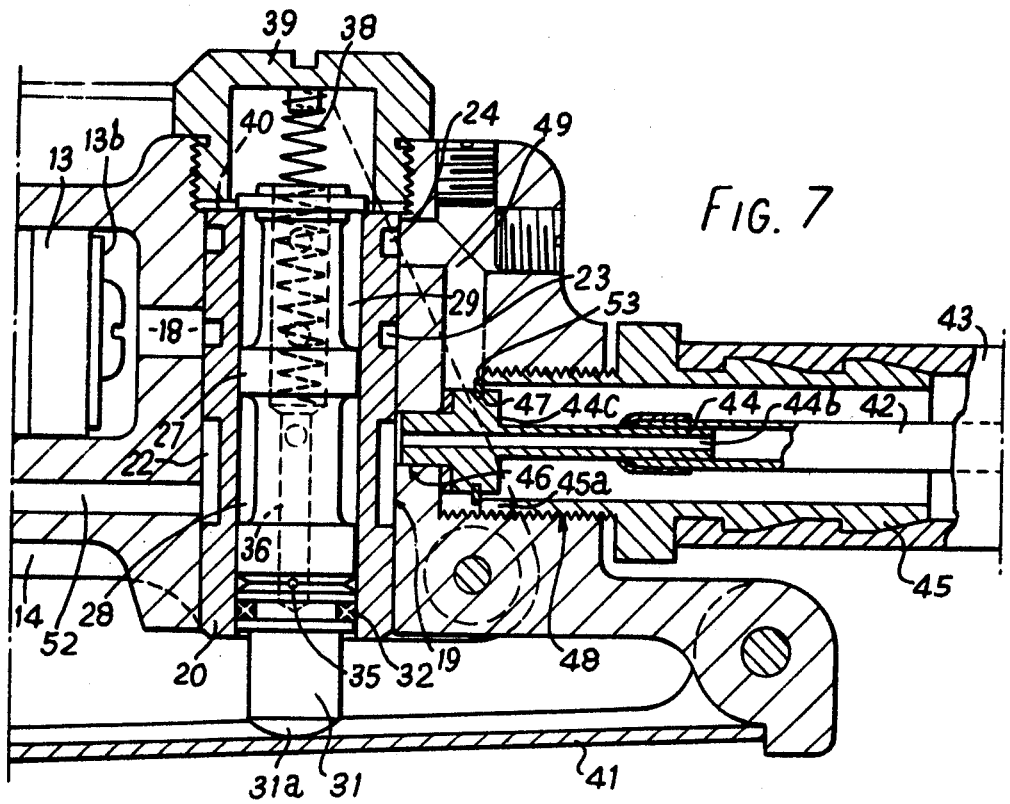
FIG. 7
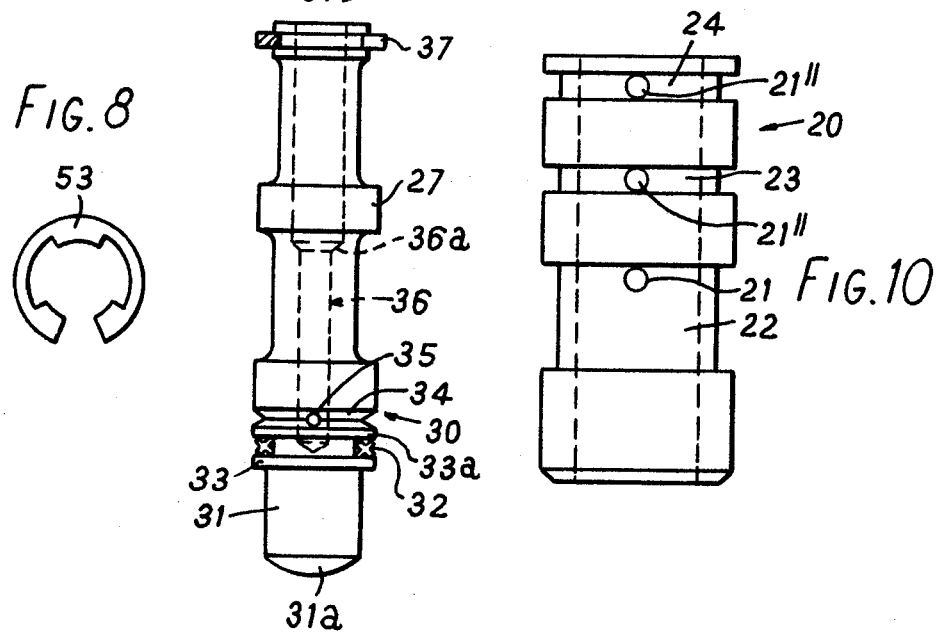
FIG. 8
FIG. 9
FIG. 10

HYDRAULIC SECATEURS

The subject matter of the present invention is improvements to hydraulic secateurs, notably for pruning or harvest work in fruit-growing, viticulture or horticulture.

Such secateurs commonly comprise two blades, including at least one mobile blade operated by a hydraulic device comprising: on the one hand, a drive piston controlled by said mobile blade and mounted with play for sliding in a longitudinal bore formed in the handle of said secateurs; and on the other hand, a hydraulic distributor controlling the movements of the piston and made up of a distributing slide valve moving in a cylindrical jacket positioned to the rear of said piston and perpendicularly to the latter's axis.

These secateurs have a certain number of drawbacks, so that users generally prefer pneumatic secateurs, despite the latter's notorious imperfections.

One of the drawbacks of known hydraulic secateurs lies in the complexity of their hydraulic mechanism and in their faulty operation.

Another vexatious result of forms already put forward consists of the untimely oil leaks which escape from the hydraulic control mechanism, due to the absence of effective means of draining the oil seeping from the hydraulic distributor.

Another drawback of these embodiments is the result of the fact that the cylinder of the drive piston directly forms the outer body of the handle of the secateurs, so that this cylinder/handle is liable to knocks and, consequently, to accidental deformation leading to the secateurs rapidly becoming unusable.

Another drawback of existing hydraulic secateurs is that they are connected to two separate, flexible feed and return pipes which are not easy to handle and the fact that there are two of them means that they frequently get caught in the growth and risk getting holed, preventing said secateurs from working, notably as regards the feed pipe.

The aims of the present invention are in particular to overcome these various drawbacks.

Conforming to a first design, the hydraulic secateurs according to the invention include a hydraulic distributor controlling the movements of the piston and consisting of a distributing slide valve moving in a cylindrical jacket positioned to the rear of said drive piston and perpendicularly to the latter's axis, said jacket being provided with spaced peripheral grooves into which radial apertures in its side wall give, one of said grooves being positioned in permanent connection with an aperture communicating with the bore in which said piston moves and capable of being put into connection, according to the position of said distributing slide valve, either with the groove which is in constant connection with the intake of hydraulic fluid under pressure or with the groove permanently communicating with the return aperture for said fluid.

According to another characteristic, the drive piston controlled by the mobile blade of the secateurs comprises two opposite working surfaces of unequal areas, i.e. a working surface with a small area delimiting a chamber in constant connection with the intake of the hydraulic fluid under pressure and an opposite working surface of a larger area delimiting a second chamber which can be made to communicate either with the intake or the return of the fluid, by means of the hydraulic distributor; said secateurs comprising also a passage enabling communications to be established between the two chambers delimited by the drive piston when the distributing slide valve is moved into the position controlling the closure of the blades.

According to another characteristic, the secateurs are connected to the source of hydraulic fluid by means of coaxial flexible pipes one of which brings the hydraulic fluid under pressure to said secateurs while the second provides for the return of said fluid to said source.

According to another characteristic, the hydraulic secateurs conforming to the invention include: on the one hand, an outer body consisting of metal sheet suitably folded to give it a generally U-shaped outline varying in depth from one end to the other of said body, to the front of which the hook or fixed blade of the secateurs is fixed; and on the other hand, an inner body fitted longitudinally into the rear portion forming the handle of said outer body and in which the hydraulic device operating said mobile blade is housed.

These aims and characteristics, and yet others, will emerge more clearly from the description which follows and from the attached drawings, wherein:

FIG. 1 is an axial sectional view of the hydraulic secateurs according to the invention, in the "blades open" position.

FIG. 2 is an axial sectional view comparable to FIG. 1, showing the secateurs in the "blades closed" position corresponding to the cutting action.

FIG. 3 is a partial view, identical to FIG. 1, on a different scale, illustrating the rear part or handle of the secateurs.

FIG. 4 is a partial view, identical to FIG. 2, on a different scale, also illustrating the rear part of the secateurs.

FIG. 5 is a section along the line 5—5 in FIG. 3.

FIG. 6 is a section along the line 6—6 in FIG. 3.

FIG. 7 is a partial view comparable to FIG. 3, on a larger scale, which shows another advantageous method of connecting the coaxial pipes to the rear part of the secateurs.

FIG. 8 is a front view of the retaining circlip used in this method of connection.

FIG. 9 illustrates, from the outside and on an enlarged scale, the mobile component of the hydraulic distributor.

FIG. 10 illustrates the jacket used to house the moving slide valve of the hydraulic distributor.

Reference is made to said drawings to describe a particularly advantageous, though in no way limitative, example of embodiment of the secateurs according to the invention.

These secateurs include a mechanical part consisting of an outer body 1 formed of metal sheet suitably folded to give it a generally U-shaped outline, varying in depth from one end to the other of said body.

The fixed blade or hook 2 of the secateurs is fixed, e.g. by means of bolts 3, to the front of the body 1, between the drawn-together side walls of said body.

Articulated on the fixed blade 2, by means of an axle 4, is the mobile blade 5 which is moreover fixed, by screwing at 5a, to a lever 5b also articulated on the axle 4 thus forming the rear part of said blade.

The lever 5b is connected to a rocking lever 6 by means of one or, preferably, two symmetrical small push-rods 7.

The push-rods are articulated on the end of lever 5b and one end of rocking lever 6 by means of quick-fix links 8 and 9 respectively.

Moreover, push-rods 7 comprise, starting from the end fixed to lever 5b, successively spaced bore-holes 7a. These bore-holes enable lever 5b to be fixed at different points on push-rods 7 and, in this way, rapid and easy adjustment of the gap between the fixed blade 2 and the mobile blade 5. This arrangement also makes it possible to preserve the desired gap, despite wear on blade 5.

Rocking lever 6 is articulated, by means of an axle 10, in the region of the front part of outer body 1, between the latter's side walls.

The secateurs moreover include a hydraulic part comprising the device operating the mobile blade and housed inside the mechanical part or outer body 1 which protects it from knocks and from which it can easily be separated, e.g. in order to carry out repairs.

This hydraulic part includes an inner body 14 fitted in fixed fashion, e.g. by means of screws 15, in the rear part, forming a handle, of outer body 1.

The inner body has a cylindrical bore 17 in which is slidingly mounted the drive piston 13 the rod 12 of which is fastened, preferably by means of a quick-fix link 11, to rocking lever 6.

The mobile blade 5 is thus connected to the front end of rod 12 of the drive piston by means of rocking lever 6, push-rods 7 and quick-fix links 8, 9 and 11.

The front end of bore 17 is closed by means of a stopper 16 allowing the passage and fluid-tight guiding of rod 12 of the drive piston.

The wall delimiting the rear end of said bore comprises an axial aperture 18 giving into a cylindrical housing 19 formed perpendicularly to said bore, in the rear part of inner body 14.

Installed in this housing is the hydraulic distributor comprising a distributing slide valve 27 moving in a jacket 20 in which there are radial apertures 21 - 21' - 21'' giving into spaced peripheral grooves 22, 23 and 24 respectively in said jacket. Each annular groove communicates, e.g. with two diametrically opposite radial apertures (21, 21', 21'').

The intermediate groove 23 is in constant connection with axial aperture 18, while the end grooves 22 and 24 are in permanent communication with the hydraulic fluid intake 25 and return 26 respectively.

The distributing slide valve 27 delimits, inside the jacket bore, two chambers 28 and 29 which are in constant connection with the fluid intake 25 and return 26 respectively. Chamber 28 is, moreover, delimited by a dummy piston 30 integral with the rod 31 carrying the distributing slide valve 27. On the outer side of the dummy piston there is a gasket 32, fitted between two circular shoulders 33 - 33a on rod 31. Between this sealing device sliding in the bore in jacket 20 and dummy piston 30, an annular channel 34 is formed, into which there gives a radial bore hole 35 communicating with a blind bore 36 formed in rod 31 and opening out at the inner end of the latter. On the outer side of sealing device, a short length of rod 31 emerges from jacket inlet 20, notably in the "at rest" position (FIGS. 1, 3 and 7).

Around the periphery of the opposite end of rod 31 a retaining circlip 37 is fitted, preventing the mobile component of the distributor from coming out of the jacket inlet from which rod 31 emerges. A compression spring 38, partly housed in blind bore 36, is pressed, on the one hand, at one of its ends, against a shoulder 36a formed by a narrowing in the diameter of said bore 36 at a suitable distance from its open end and, on the other hand, at its opposite end, against the bottom of a stopper 39 screwed so as to be fluid-tight at the corresponding end of the cylindrical housing 19 in body 14.

It has been indicated that intake 25 communicates with groove 22, while return 26 is in constant connection with groove 24. It is further clarified that there is at least one passage 40 between circlip 37 and its bearing surface, in the "at rest" position, so that communication is still possible, in that position, between blind bore 36 and return 26.

Thus, any oil which might seep between the dummy piston and the wall of the bore of jacket 20 drains into channel 34 then, via bore hole 35 and blind bore 36 giving into the inner end of rod 31, is evacuated, through passage 40, to return 26. In this way, an efficient draining device is formed, preventing any oil from leaking through the opening in jacket 20 from which emerges and 31a forming a tumbler on rod 31. Moreover, this arrangement prevents gasket 32 from being subjected to heavy pressure.

On the rear end of the inner body, the operating lever 41 of the secateurs is articulated, its inner surface bearing against the tumbler 31a and whose pivotal movement outwards is limited by a stop against which its rear end comes to bear, in the "at rest" position.

According to a characteristic arrangement resulting from the construction described, the cutting axis a—a is in the extension of the axis of the handle of the secateurs. In this way, the blades are in the normal extension of the handle and the hand holding it, which makes it much easier to reach shoots, branches or other stems to be cut.

According to another important characteristic of the invention, the secateurs are connected to the source of hydraulic fluid under pressure (pump or hydraulic circuit of a tractor, for example) by means of two flexible coaxial pipes 42 and 43 one of which brings the fluid under pressure to said secateurs while the second returns said fluid to said source.

For this purpose, the secateurs are provided, at the rear part, with coaxial connections 44 and 45 for connecting the ends of said flexible pipes 42 and 43 respectively.

According to another characteristic arrangement, the pipe which brings the fluid under pressure is the inner, small-diameter pipe 42 while said fluid is returned through the outer, larger-diameter pipe 43.

The inner connection 44 can consist of a small connecting sleeve 44a set in the rear end of a small tube 44b, the opposite end of which is inserted into an aperture 46 formed in the rear part of body 14 and communicating with groove 22. An annular gasket 47 is housed between the rear surface of said body and a circular shoulder 44c on said tube. The cylindrical hole 46 is made in the bottom of a threaded hollow 48 of a larger diameter and coaxially to the latter. The outer connection 45 is screwed into this hollow in body 14 and its inner end bears against the rear surface of shoulder 44c.

It will be understood that as the outer connection 45 is screwed, it pushes shoulder 44c which exerts pressure on gasket 47, so that the inner connection is firmly positioned while a perfect seal is provided.

The inner end of outer connection 45 has radial slots or grooves 45a to allow the return of the oil, while an annular space is left between the outer and inner surfaces, respectively, of connections 44 and 45, as well as between the outer and inner surfaces of flexible pipes 42 and 43. The evacuation groove 24 permanently communicates with the connection 45 of return pipe 43 by means of a passage 49 formed in the rear part of body 14.

FIG. 7 shows another very advantageous method of fixing the connections to the rear part of the secateurs. According to this method of embodiment, the inner end of the outer connection is mounted to bear against the rear face of a perforated circlip 53 (illustrated separately in FIG. 8) fitted on the circular shoulder 44c of inner connection 44. In this case, the diameter of shoulder 44c is smaller than that of the bore of the outer connection, so that it can slide inside the latter.

It can be understood that, in the way previously indicated, as the outer connection 45 is screwed, it exerts pressure on the circlip 53 and also, therefore, on shoulder 44c integral with the latter.

The purpose of this arrangement is notably to allow uncoupling of the flexible pipes, e.g. for replacement of one of them and, in particular, the outer pipe which is more exposed to wear. In fact, bearing in mind that the coaxial pipes are provided with a similar connecting device at the opposite end connected to the fluid source, it is necessary for one of the inner connections to be able to slide inside the opposite outer connections in order to be able to extract the inner pipe from the outer pipe.

It will be understood that this embodiment offers a certain number of advantages arising from easier handling, since the user has only one apparent pipe to drag or move, risks of catching in growth are correspondingly reduced, the bulk for storage is smaller, the high pressure fluid intake pipe is protected by the low pressure return pipe, connecting the pipes to the secateurs or the fluid source is quick and easy.

According to another characteristic arrangement, the drive piston 13 comprises two opposite working surfaces of unequal area, i.e. a surface 13a with a small area delimiting, inside bore 17, a chamber 50 in constant connection with the high pressure fluid intake and a surface 13b with a larger area delimiting a second chamber 51 which can be made to communicate with said intake or with the return of said fluid by means of the distributing slide valve 27.

An annular space of small radial size is left between the outer surface of rod 12 and the wall of bore 17 so that the difference between the working areas of the opposite surfaces of piston 13 is relatively large.

A channel 52 formed in body 14 establishes permanent communication between chamber 50 and the peripheral inlet groove 22. The width of the latter is designed to take into account the difference in level between aperture 46 and the start of channel 52. Inlet groove 22 communicates constantly with annular chamber 28 delimited by the distributing slide valve 27 and dummy piston 30 integral with rod 31 carrying said distributing slide valve and the emerging end 31a of which forms a tumbler.

It will be understood that when the mobile component 27-30-31 is pushed back towards the back of its housing, the movement of the distributing slide valve 27 makes it possible to establish communication between chambers 28 and 51. In this way, a connection is also made between chambers 50 and 51 via a passage comprising: channel 52, inlet groove 22, apertures 21, annular chamber 28, apertures 21', peripheral groove 23 and aperture 18.

The operation of the arrangement or double-acting ram which has just been described is as follows:

When the secateurs are connected to the source of hydraulic fluid, oil under high pressure penetrates into chamber 50 through the circular inlet groove 22 and channel 52 and pushes piston 13 backwards (FIGS. 1, 3 and 7), thus separating or opening the blades of the secateurs.

When the operator presses on the tumbler 31a, by means of the operating lever 41, the movement of the distributing slide valve 27 allows oil under pressure to enter chamber 51 via inlet groove 22, apertures 21 giving into the latter, chamber 28, apertures 21' communicating with groove 23, said groove and axial aperture 18.

Piston 13 therefore moves forward as a result of this intake of oil under pressure, since the difference between the working surfaces of opposite faces 13a and 13b of said piston distinctly favours this intake.

The forward movement of piston 13 causes the mobile blade 5 to pivot to the closed position corresponding to the secateurs' cutting action (FIGS. 2 and 4).

During this phase of operation, part of the oil contained in chamber 50 goes into chamber 51 via 52 - 22 - 21 - 28 - 21' - 23 - 18.

When the lever 41 is released, the mobile component 27-30-31 of the distributor is pushed back by spring 38, so that chamber 51 is put in communication with return 26 via aperture 18, circular groove 23, apertures 21' giving into annular chamber 29, said annular chamber, apertures 21" giving into circular outlet groove 24, said outlet groove and passage 49.

The pressure permanently existing in chamber 50 therefore causes the piston to be returned to its initial piston, said piston removing the oil contained in chamber 51, which is sent to return 26 by the aforementioned route. An advantage of this device, apart from its simplicity and its perfect working, is that the return of the drive piston occurs at constant speed at a rate substantially equivalent to that of its forward travel corresponding to the cutting action.

Moreover, the secateurs so arranged have a longer useful life and their lightness is increased.

Also included in the scope of the present patent are modifications or substitutions which may be made by a technician in this field to the arrangements described and which, without altering their original characteristics, are merely technical equivalents thereof.

I claim:
1. In hydraulic secateurs, of the kind having
   (i) a handle
   (ii) a pair of relatively movable blades carried by said handle;
   (iii) a cylinder body in said handle, having a bore;
   (iv) a piston slidable axially in the bore of said cylinder body;
   (v) means connecting said piston to one of said blades;
   (vi) a spool valve, for control of hydraulic fluid for operating said piston, said valve being disposed in said cylinder body, said valve including a cylindrical jacket disposed in the cylinder body and having its axis perpendicular to the axis of the cylinder bore and a valve spool slidable axially in said jacket, the improvement which comprises:
   (a) said jacket having in its external surface three axially spaced circumferential grooves, a first of said grooves being in permanent communication with an aperture in the cylinder opening into the cylinder bore, a second of said grooves being in permanent communication with a fluid intake passage in said cylinder body, the third of said grooves being in permanent communication with a fluid outlet passage in said cylinder body;

(b) said valve spool having a first axial end position and a second axial end position of movement in said jacket, said valve spool in its first end position placing said first groove in communication with said second groove, said valve spool in its second end position placing said first groove in communication with said third groove.

2. Hydraulic secateurs, as claimed in claim 1, wherein said valve spool is integral with a rod protruding from an axial end of said jacket, said valve spool having a sealing piston axially spaced from its valve piston and bounding with the valve piston in said jacket, a first annular chamber permanently in communication with said fluid intake passage, said valve piston also bounding in said jacket a second annular chamber permanently in communication with said fluid outlet passage.

3. Hydraulic secateurs, as claimed in claim 2, comprising means for draining any fluid which may escape from said first annular chamber, said device comprising a seal on said valve spool axially spaced from said sealing piston, a peripheral groove in said valve spool between said sealing piston and said seal, a radial passage leading inwardly from said groove, and an axial passage in said valve spool communicating at one end with said radial passage and at the other end with said fluid outlet passage.

4. In hydraulic secateurs, of the kind having:
(i) a handle
(ii) a pair of relatively movable blades carried by said handle;
(iii) a cylinder body in said handle, having a bore;
(iv) a piston slidable axially in the bore of said cylinder body;
(v) means connecting said piston to one of said blades;
(vi) a spool valve, for control of hydraulic fluid for operating said piston, said valve being disposed in said cylinder body, said valve including a cylindrical jacket disposed in the cylinder body and having its axis perpendicular to the axis of the cylinder bore and a valve spool slidable axially in said jacket, the improvement which comprises:
(a) said piston having axially opposed first and second surfaces for contacting with hydraulic fluid, said surfaces for contacting with hydraulic fluid, said surfaces being of unequal area, said first surface with a lesser area bounding in said cylinder bore a first chamber permanently in communication with a fluid intake passage in said cylinder body said second surface with a larger area bounding in said cylinder bore a second chamber which, by operation of the spool valve, can be placed selectively in communication with said fluid intake passage and with a fluid outlet passage in said cylinder body.

5. Hydraulic secateurs, as claimed in claim 4, wherein said spool valve is arranged such that, in its position of operation in which said second chamber is placed in communication with said fluid intake passage, said second chamber is placed also in communicaton with said first chamber.

6. Hydraulic secateurs, as claimed in claim 1, wherein said valve spool comprises a circumferential groove, and wherein a circlip is seated in said groove and is adapted to abut against an end of said jacket to limit axial movement of said spool in said jacket.

7. Hydraulic secateurs, as claimed in claim 1, further comprising first and second coaxial flexible tubes connecting said secateurs to a source of hydraulic fluid, said first coaxial tube communicating with said fluid intake passage, said second coaxial tube communicating with said fluid outlet passage.

8. Hydraulic secateurs, as claimed in claim 1, wherein said cylinder body has an internally threaded recess communicating with said fluid outlet passage, and an axial aperture providing communication between said threaded recess and the fluid inlet passage, a first inner fluid feed conduit being engaged by an end into said axial aperture, a second outer fluid exhaust conduit being coaxially disposed about said first conduit and being threaded at one end into said recess and bearing against a shoulder on said first conduit to retain said first conduit in position.

9. Hydraulic secateurs, as claimed in claim 8, wherein said first inner conduit has a circumferential recess adjacent said end, and wherein said shoulder is constituted by a circlip engaged in said circumferential recess.

* * * * *